(12) United States Patent
Hediger

(10) Patent No.: US 12,017,285 B2
(45) Date of Patent: Jun. 25, 2024

(54) CLAMPING CHUCK

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 365 days.

(21) Appl. No.: 17/358,242

(22) Filed: Jun. 25, 2021

(65) Prior Publication Data

US 2022/0055121 A1 Feb. 24, 2022
US 2024/0173778 A9 May 30, 2024

(30) Foreign Application Priority Data

Aug. 21, 2020 (CH) .................................. 01043/20

(51) Int. Cl.
- *B23B 31/30* (2006.01)
- *B23B 31/107* (2006.01)
- *B23Q 1/00* (2006.01)
- *B23Q 17/00* (2006.01)

(52) U.S. Cl.
CPC .......... *B23B 31/30* (2013.01); *B23B 31/1071* (2013.01); *B23Q 1/0072* (2013.01); *B23Q 17/005* (2013.01); *B23B 2260/128* (2013.01)

(58) Field of Classification Search
CPC ................ B23B 31/30; B23B 31/1071; B23B 2260/128; B23Q 1/0072; B23Q 17/005; B25J 15/0416
See application file for complete search history.

(56) References Cited

U.S. PATENT DOCUMENTS

| | | | | |
|---|---|---|---|---|
| 4,504,824 A | * | 3/1985 | Mello | B23Q 17/003 408/6 |
| 6,641,128 B2 | * | 11/2003 | Fries | B23Q 11/005 279/4.06 |
| 8,256,773 B2 | * | 9/2012 | Sandmeier | B23Q 1/0072 279/123 |

FOREIGN PATENT DOCUMENTS

| | | | | |
|---|---|---|---|---|
| CN | 108421995 A | * | 8/2018 | ............ B23B 31/10 |
| DE | 102014110007 B4 | * | 2/2016 | ........... B23Q 1/0018 |
| DE | 102016118704 A1 | * | 4/2018 | |
| EP | 1344599 B1 | | 2/2003 | |
| EP | 2052808 B1 | | 8/2008 | |

(Continued)

OTHER PUBLICATIONS

Swiss Search Report for Application No. 01043/20 Dec. 1, 2020.

*Primary Examiner* — Eric A. Gates
*Assistant Examiner* — Reinaldo A Vargas Del Rio
(74) *Attorney, Agent, or Firm* — Maginot, Moore & Beck LLP

(57) ABSTRACT

A clamping chuck is provided for clamping palettes having a clamping spigot. The clamping chuck includes a receiving opening for the clamping spigot and a clamping device that includes an actuating piston displaceable between an initial position and a locking position for actuating clamping members for clamping the clamping spigot in the receiving opening. The clamping chuck includes a monitoring line that is acted upon pneumatically and leads from an inlet to an outlet. the receiving opening includes a conical insertion region, into which at least one control hole connected to the monitoring line emerges, the control hole being closed by the clamping spigot. A valve device is arranged between the inlet and the outlet of the monitoring line to vary the flow of a fluid through the monitoring line depending on the position of the actuating piston.

17 Claims, 7 Drawing Sheets

(56) References Cited

FOREIGN PATENT DOCUMENTS

EP 2177309 A8 10/2009
EP 2218541 A3 10/2009

* cited by examiner

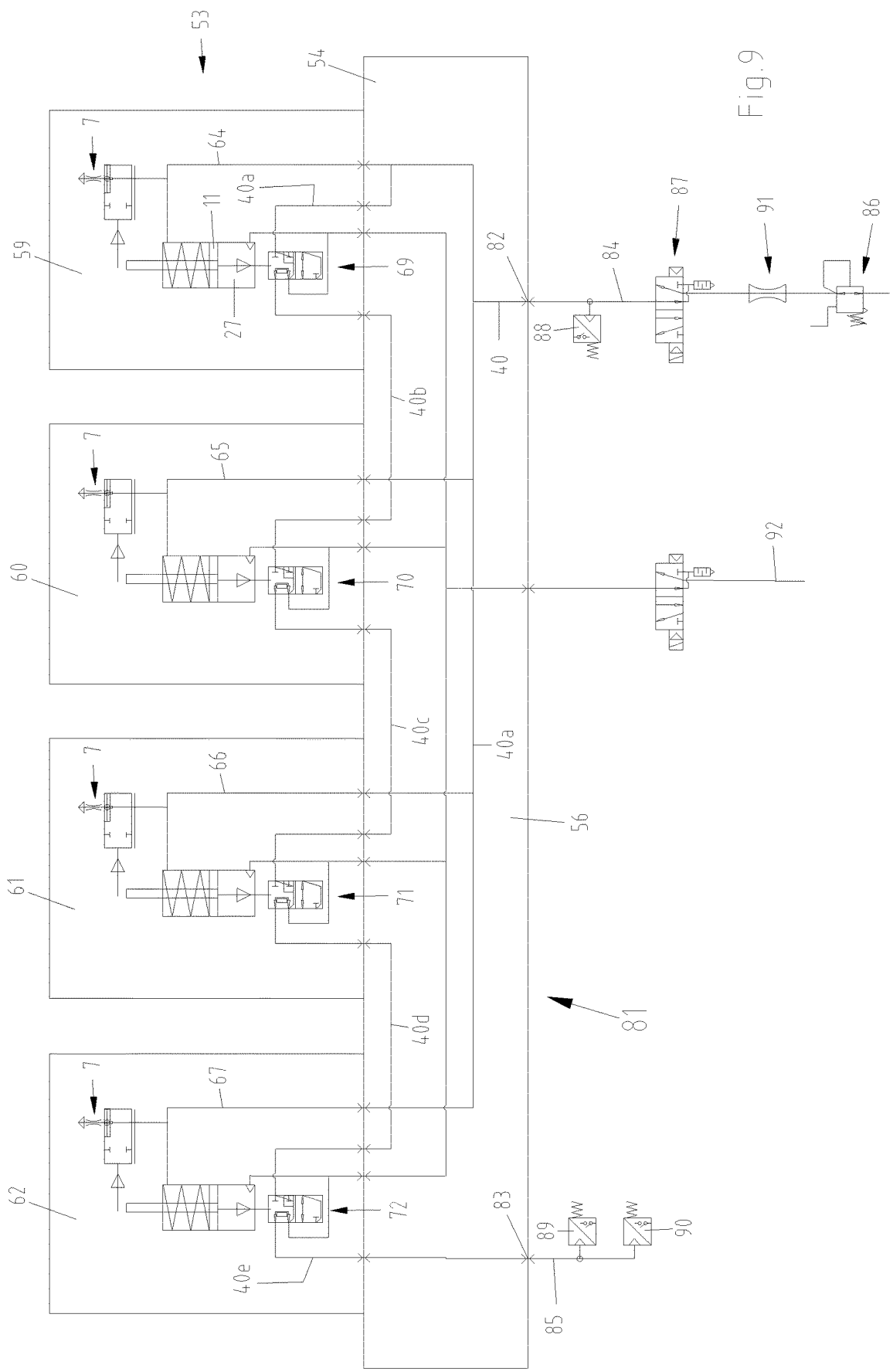

CLAMPING CHUCK

PRIORITY CLAIM

This application claims priority to Swiss Application No. 01043, entitled "CLAMPING CHUCK", filed in the name of the same inventor and applicant on Aug. 20, 2020, the entire disclosure of which is incorporated herein by reference.

BACKGROUND

The present invention relates to a clamping chuck designed according to the preamble of claim 1, to a clamping device designed according to the preamble of claim 9, a clamping chuck arrangement designed according to the preamble of claim 13 and a method designed according to the preamble of claim 15.

Clamping chucks of the type in question here are used for the position-defined clamping of palettes and/or workpiece carriers. Apart from the single clamping chucks for clamping pallets or workpiece holders provided with one clamping spigot, multiple clamping chucks are also known, which comprise at least two clamping chucks for clamping palettes provided with a corresponding number of clamping spigots. Such multiple clamping chucks are also referred to below in particular as clamping devices, wherein the clamping chucks thereof are arranged on a clamping base. The term clamping chuck arrangement is used to mean respectively a single or multiple clamping chuck including its periphery such as connection or pressure lines, sensors, pressure regulators, throttles etc.

The clamping chuck or the respective clamping base is usually mounted fixed on the machine bench of a processing machine, whereas the palette can be repeatedly clamped precisely on the clamping chuck or the clamping device. The respective clamping chuck is provided with a receiving opening and a clamping device for clamping the clamping spigot in the receiving opening. The palette usually carries a workpiece to be processed or a tool.

When such clamping chucks or clamping bases are used in work processes taking place semi-automatically or fully automatically, the palette is usually fed to the clamping chuck or the clamping device and again removed therefrom by means of a handling robot. It is important that the palette is securely clamped and held. If for example the palette is not correctly fixed on the clamping chuck or the clamping device, there is the risk of the latter working loose during the mechanical processing of the workpiece clamped thereon, for example during a milling process, which can lead to considerable damage and endanger people.

EP 1 344 599 A1 discloses a clamping device with a clamping chuck and a clamping spigot which can be clamped thereon. The clamping chuck is provided with a central opening for receiving the clamping spigot. The clamping chuck also comprises a plurality of openings for blowing air out. Some of these blow-out openings are arranged in a conical insertion section of the central opening and can be closed by means of the clamping spigot or its centring surface sections. The blow-out openings are used solely for the cleaning of the aforementioned centring surface sections.

A clamping device with a clamping chuck for the releasable fixing of a workpiece carrier is known from EP 2 052 808 A1. The clamping chuck is provided with a locking mechanism, which comprises a plurality of clamping elements which, in the locking position, engage in a clamping spigot connected to the workpiece carrier. Each clamping element is provided with a through-hole, which is closed at one side when the respective clamping element is correctly locked. In addition or alternatively, there is assigned to each clamping element an actuating element provided with a through-hole, the through-hole whereof is closed at one side when the respective clamping element is correctly locked and/or unlocked. The through-holes of the clamping elements or of the actuating elements are connected by a common connecting line to a pneumatic source. At least one sensor for detecting the air flow is provided in the connecting line. By means of the sensor, it can be detected whether the clamping elements have been correctly unclamped or clamped. The sensor is connected to an electronic control and evaluation device.

A quick-action clamping cylinder for clamping a retractable nipple is known from EP 2 177 309 A1. The quick-action clamping cylinder is intended to be used to control the function of the retractable nipple during clamping. The quick-action clamping cylinder comprises a housing with a central cutout for receiving the retractable nipple arranged on a palette. A locking mechanism with a pressure-medium-actuated piston and a plurality of locking bodies is arranged in the housing. The piston is moved by means of a set of springs into the locking position and unlocked in a pressure-medium-actuated manner. Arranged in the displacement path of the set of springs is a first actuating element, the actuating signal whereof is monitored. A second actuating element is located upstream in the control flow of the first actuating element, which second actuating element detects the displacement state of the retractable nipple. Both actuating elements are designed as switches in the form of fluidic control valves, which can be actuated path-dependent, said fluidic control valves being arranged in a control line and opening or closing the latter in a state-dependent manner.

A further quick-action clamping cylinder for clamping a retractable nipple is known from EP 2 218 541 A1. This quick-action clamping cylinder is intended to provide a control means for the correct locking of a retractable nipple in the housing of the quick-action clamping cylinder. For this purpose, a spring-loaded actuating element is arranged in the housing of the quick-action clamping cylinder, which can be actuated by the retractable nipple against the spring force and the displacement path of which controls the passage for a control medium.

Finally, a tool sensing system for a processing machine—milling machine—emerges from U.S. Pat. No. 4,504,824 A. The processing machine is provided with a stationary part, inside which a spindle is usually mounted rotatably. The tool holder is provided with a conical cutout for receiving the conical shaft of a processing tool. The stationary part is provided with an annular chamber surrounding the spindle, from which radial holes lead through the spindle to the conical cutout. The annular chamber is connected by a line to a pressure source, wherein a pressure regulator is arranged in the line. In addition, the line is connected to a pressure switch. As soon as a processing tool is received and clamped in the holder, the radial holes from the conical shaft of the processing tool are closed, which can be monitored by means of a pressure switch.

SUMMARY OF THE DISCLOSURE

The object of the invention is to develop a clamping chuck designed according to the preamble of claim 1 for clamping palettes provided with a clamping spigot, in such a way that the presence of the palette in the clamping chuck can be monitored.

The solution to the object is defined by the features of claim 1. According to the invention, the clamping chuck is provided with a monitoring line which can be acted upon pneumatically and leads from an inlet to an outlet, wherein the receiving opening comprises a conical insertion region, into which at least one control hole connected to the monitoring line emerges, which control hole can be closed by means of the clamping spigot.

In that the clamping chuck is provided with a monitoring line which can be acted upon pneumatically and leads from an inlet to an outlet and the receiving opening comprises a conical insertion region, into which at least one control hole connected to the monitoring line emerges, which control hole can be closed by means of the clamping spigot, the basic possibility is provided of establishing the presence of a clamping spigot in the receiving opening. A particular advantage of this embodiment lies in the fact that the clamping chuck can be incorporated, with comparatively little effort, into the infrastructure/periphery of a processing machine which is usually already present. Since such processing machines usually comprise at least one pneumatic pressure line for the opening and/or closing of the clamping chuck, the compressed air can also be used to act on the monitoring line therewith and at a given time to measure the pressure therein. Insofar as no clamping spigot is received in the receiving opening of the clamping chuck, the pressure escapes via the control hole(s), which can be measured by means of a pressure sensor connected to the monitoring line and recorded and evaluated by means of evaluation electronics. Since evaluation electronics are usually also present, aside from at least one pressure sensor only a software adaptation of the evaluation electronics is required.

Preferred embodiments and developments of the clamping chuck are described in dependent claims 2 to 8.

Thus, in a preferred development, provision is made such that the clamping device of the clamping chuck comprises an actuating piston displaceable between an initial position and a locking position for the purpose of actuating clamping members, and the clamping chuck comprises a valve device arranged between the inlet and the outlet of the monitoring line, by means of which valve device the flow of a fluid through the monitoring line can be varied depending on the position of the actuating piston. The position of the actuating piston can be determined by means of such a valve device. Together with the features of claim 1, both the presence of the clamping spigot and also its correct clamping in the clamping chuck can be checked by means of this embodiment.

The valve device preferably comprises a valve housing and a valve body accommodated at least in sections therein, which can be displaced between a shut-off position and an open position relative to the valve housing in order to change the flow of the fluid through the monitoring line. Such a valve device is particularly well suited for the mechanical coupling with the actuating piston, so that the latter can open or close the valve device.

Particularly preferably, the valve body is in the open position when the actuating piston is correctly displaced into the locking position, whereas it is in the shut-off position when the actuating piston is not displaced correctly into the locking position. The basic prerequisite for positive reliability is thus created, in that the valve body only occupies the open position when the actuating piston occupies the locking position required for reliable clamping of the clamping spigot. Insofar as the monitoring line is subjected to an overpressure at the inlet side, the position of the valve body, and therefore the position of the actuating piston, can easily be determined by a pressure comparison before and after the valve body.

In a further preferred development of the clamping chuck, the valve body is arranged stationary, whereas the valve housing is connected in a firmly bonded manner to the actuating piston. On the one hand, the mobile parts can thus be kept small, which leads to good utilisation of space. On the other hand, the radial and axial play of an inner housing part can also be kept small, since in the case of a kinematic reversal, i.e., valve body arranged mobile and housing stationary, the aforementioned play would have to be increased on account of the lever action. Furthermore, this embodiment is also particularly well suited for series connection of the valve devices.

In a particularly preferred development, the valve housing comprises a first outer part and a second inner part, wherein the outer part is connected in a firmly bonded manner to the actuating piston, whereas the inner part is connected in a form-fit manner to the outer part, and wherein the inner part is accommodated with radial play in the outer part. This embodiment makes it possible for the valve device to be able to compensate somewhat for play in the radial direction and thus to function reliably. This is thus advantageous, since the actuating piston must always have some radial play, in order that it can function reliably over a long period and can be moved back and forth reliably between the initial position and the locking position.

A preferred development of the clamping chuck makes provision such that an axial inlet hole leads from the upper side into the valve body and an axial outlet hole leads from the underside into the valve body, wherein the axial inlet hole emerges into a first radial through-hole and wherein the axial outlet hole emerges into a second radial through-hole, and wherein the first radial through-hole runs above the second radial through-hole, and wherein the inner part of the valve housing is provided with an annular space, the axial length of which corresponds at least to the distance between the two radial through-holes and wherein the annular space extends over the two radial holes when the actuating piston is in its locking position. Such a valve device is reliable and simple in design. In addition, the previously mentioned "floating" accommodation of the inner in the outer housing part can thus be implemented particularly well.

Particularly preferably, the monitoring line is continuously open between the inlet and the outlet, but is closed with respect to the atmosphere, when a clamping spigot is received in the receiving opening of the clamping chuck and is correctly locked by means of the clamping device. This embodiment also favours positive reliability, in that a sufficient, predetermined pressure can be built up at the outlet side only when a clamping spigot is received and also correctly locked in the respective clamping chuck.

A further object of the invention consists in developing a clamping device with at least two clamping chucks designed according to one of the preceding claims for clamping a palette provided with a number of clamping spigots corresponding to the number of clamping chucks, in such a way that it can be verified in a straightforward manner whether a clamping spigot is received in all the clamping chucks.

The solution to the object is defined by the features of claim 9. For this purpose, the clamping chuck of the clamping device is accommodated in a common clamping base, wherein the clamping base is provided with a monitoring line which can be acted upon pneumatically and leads from an inlet to an outlet, and wherein the monitoring line is connected to all the control holes arranged in the insertion region of the respective clamping chuck.

By means of this embodiment, the basic possibility is provided of checking, by means of the monitoring line, whether a clamping spigot is received in all the clamping chucks, since a sufficient pressure can be built up in the monitoring line only when all the control holes are closed in each case by a clamping spigot.

Very particularly preferably, each clamping chuck of the clamping device comprises a valve device, by means of which the flow of a fluid through the monitoring line can be varied depending on the position of the actuating piston, wherein the valve devices are arranged between the inlet and the outlet of the monitoring line and are connected to one another in series, in such a way that a passage between the inlet and the outlet of the monitoring line exists only when all the actuating pistons are correctly locked. With this embodiment, a sufficient pressure can be built up at the outlet of the monitoring line only when all the clamping spigots are correctly locked.

A further, particularly preferred development makes provision such that, in the region of the respective clamping chuck, a pneumatic retightening line leads into a retightening space arranged above the respective actuating piston, wherein each retightening line is connected directly or indirectly to the monitoring line. This embodiment makes it possible for all the actuating pistons to be retightened by the introduction of compressed air into the monitoring line. Since a "retightening line" is often already provided in generic clamping devices, the existing retightening line can be used at the same time as a monitoring line. For this purpose, comparatively small adaptations need to be made to existing clamping devices, especially since inlets and outlets provided with couplings already exist.

A further object of the invention consists in implementing the clamping chuck arrangement with a clamping chuck designed according to any one of claims 1 to 8 or a clamping device designed according to any one of claims 9 to 12, which is provided with means for monitoring the presence and the correct clamping of the palette provided with a clamping spigot in the clamping chuck or is provided with means for monitoring the presence and the correct clamping of the palette provided with a plurality of clamping spigots in the clamping device.

This object is solved with a clamping chuck arrangement according to claim 13.

In that the clamping chuck arrangement comprises an inlet line which can be connected to a pneumatic pressure source and which is connected to the inlet of the monitoring line running through the clamping base, and in that the monitoring line is connected at the outlet side to an outlet line and the outlet line is connected to at least one pressure sensor for detecting the pressure at the outlet side, the presence and the correct clamping of a palette in the clamping chuck or the clamping device can be monitored by means of a pressure sensor at the outlet side.

A preferred development of the clamping chuck arrangement makes provision such that a throttle limiting the flowing quantity of air is arranged in the inlet line, wherein the inlet line is connected to a first pressure sensor and the outlet line is connected to a second and a third pressure sensor for detecting the pressure prevailing in the monitoring line at the outlet side, and wherein the clamping chuck arrangement comprises evaluation electronics for recording and evaluating the pressures determined by means of the three pressure sensors.

In that a throttle limiting the flowing quantity of air is arranged in the inlet line and on the one hand the inlet pressure is detected and on the other hand the pressure prevailing in the outlet line is detected by means of two pressure sensors, reliable information can be obtained as to whether the respective palette is correctly clamped in the clamping chuck or in the clamping device, especially since a comparison can be made between the pressure at the inlet side and at the outlet side. The monitoring also becomes redundant due to the provision of two pressure sensors arranged at the outlet side.

Finally, a further task of the invention consists in proposing a method for the detection of the clamping state of a palette clamped on a clamping chuck arrangement according to claim 13 or 14, with which reliable and secure monitoring of the clamping state is enabled. This task is enabled by the process steps listed in claim 15.

In order to enable a pressure build-up in the pneumatic system, i.e., in the monitoring line with the associated components, the inlet line is pressurized and, after a predefined time, the pressure in the inlet line is measured and compared with the pressure measured at the outlet or the pressures measured in the outlet. If a pressure difference of less than 25% is measured between the inlet and the outlet, correct clamping of the palette is detected. If, on the other hand, the pressure difference between the inlet and the outlet amounts to more than 25%, defective clamping of the palette is detected. The aforementioned information is based on previous empirical values. Depending on the size and design of the clamping chuck or of the clamping device, these values may diverge from the aforementioned magnitudes. The only important point is in particular that a clear and reliably measurable difference is present between a correctly and an incorrectly clamped palette.

A preferred development of the method makes provision such that two pressure sensors for detecting the pressure are arranged in the outlet line of the clamping chuck arrangement connected at the outlet side to the monitoring line, wherein the inlet line is pressurized and, after a predefined time, the pressure in the inlet line is measured and compared with the pressures measured by means of the two pressure sensors arranged the outlet side, and that an error message is outputted and/or defective clamping of the palette is detected in the case of a measured pressure difference of more than 10% between the two pressure sensors arranged at the output side. A defective pressure sensor can thus be identified, which contributes to increased safety with regard to a reliable detection of the clamping state.

Further advantageous embodiments and combinations of features of the invention emerge from the following detailed description and all of the claims.

DESCRIPTION OF THE FIGURES

In the figures of the drawings used to explain an example of embodiment:

FIG. 9 shows, with the aid of a simplified diagram, a clamping chuck arrangement provided with the clamping device.

DETAILED DESCRIPTION

Figure 1:
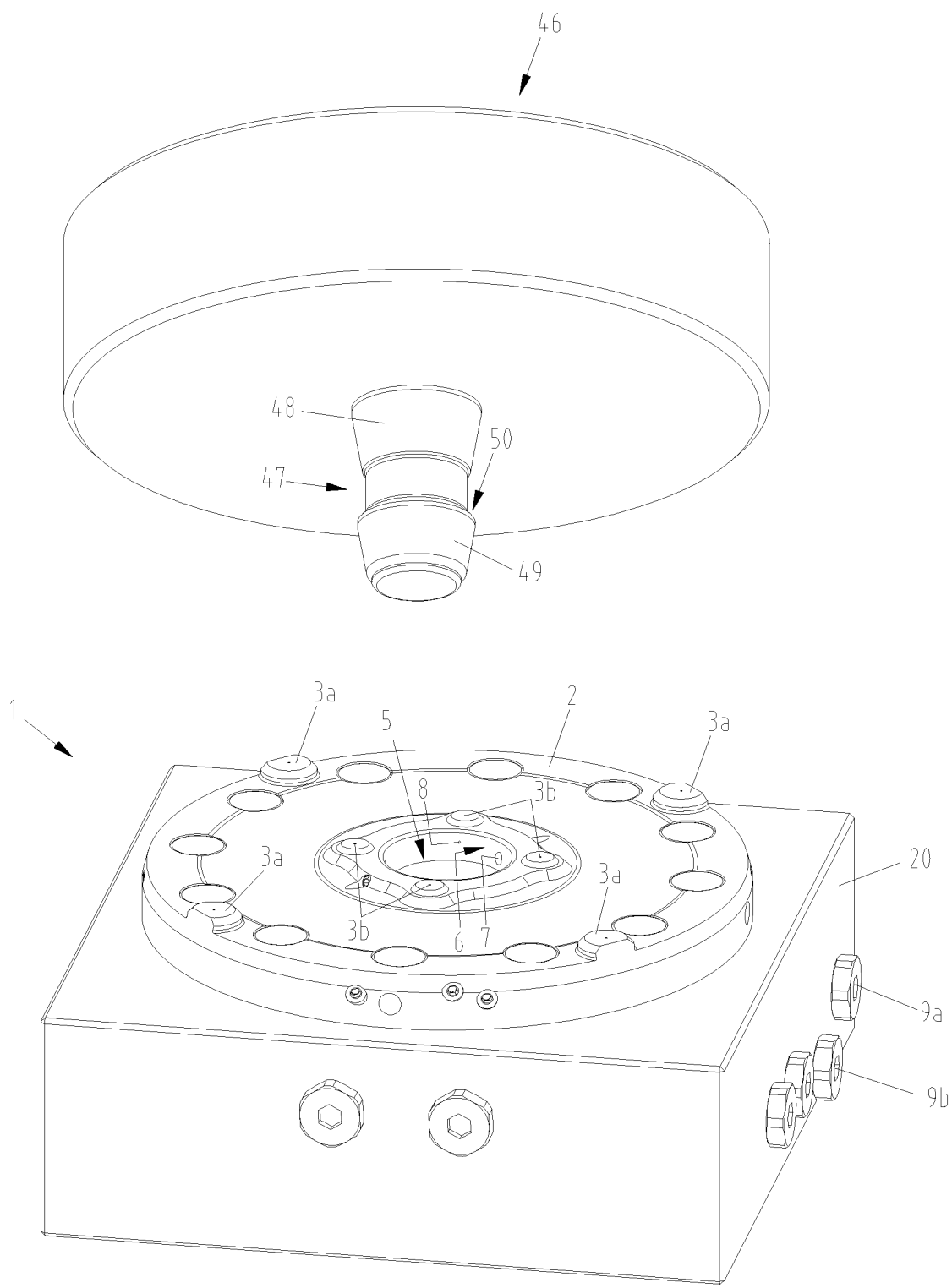
FIG. 1 shows the clamping chuck together with a palette in a perspective representation.

FIG. 1 shows clamping chuck 1 together with a palette 46 in a perspective view. Palette 46 is provided with a clamping spigot arranged on the underside. The expression palette is representative here of any kind of carrier, on which for example a tool or workpiece can be fastened. Clamping chuck 1 accommodated in clamping base 20 comprises a circular clamping plate 2, which is provided with a hollow-cylindrical extension, which extends vertically downwards into a cutout of clamping base 20. The interior space of the hollow-cylindrical extension forms a receiving opening 5 for clamping spigot 47.

Clamping plate 2 is provided on the upper side with outer and inner Z-supports 3a, 3b for palette 46, wherein both outer Z-supports 3a and also inner Z-supports 3b are arranged uniformly distributed along a circle. Insertion region 6 of receiving opening 5 is formed conical. Two control holes emerge into this insertion region 6, which are diametrically opposed and the function of which is subsequently explained in greater detail, wherein only one of the two control holes 7 can be seen from this representation. Control holes 7 preferably have a diameter between approximately 2 and 3 mm. A plurality of cleaning holes also emerge into insertion region 6 of receiving opening 5, which serve to clean a conical centring region 48 of clamping spigot 47. Clamping chuck 1 is provided with a clamping device not shown in this representation, which comprises spherical clamping members for clamping spigots 47 in receiving opening 5. The clamping device comprises an actuating piston displaceable between an open and a locked position for the purpose of actuating the clamping members. Clamping base 20 is provided with a plurality of channels and lines, which lead into and out of clamping base 20 by means of couplings/connections 9a, 9b. One of these connections 9a forms the inlet for the monitoring line, whilst another connection 9b forms the outlet for the monitoring line, as will be explained in greater detail below with the aid of FIG. 7.

Clamping spigot 47 is provided on the rear side facing palette 46 with conical centring region 48, which is matched to conical insertion region 6 of clamping chuck 1. Towards the front end, clamping spigot 47 is provided with a conical front part 49, the rear side of which forms a shoulder 50, into which the clamping members of the clamping device can engage for drawing in and fixing clamping spigot 47 in clamping chuck 1.

Figure 2:
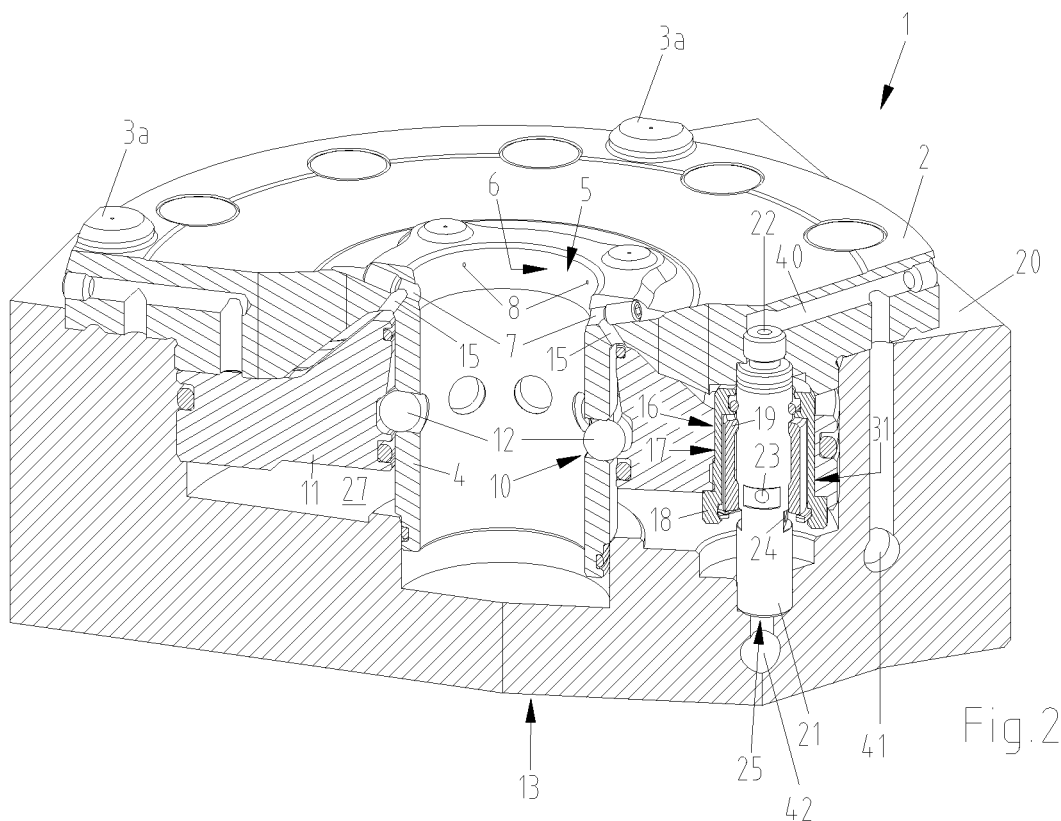
FIG. 2 shows the clamping chuck according to FIG. 1 in a partially cross-sectional and perspective view.

FIG. 2 shows clamping chuck 1 in the open position together with clamping base 20 in a partially cross-sectional and perspective view. Since the basic design of such a clamping chuck is known, for example from EP 1 321 221 A1, all the elements of the clamping chuck will not be dealt with subsequently, but in particular several elements which are essential in connection with the invention. Amongst other things, hollow-cylindrical extension 4, receiving opening 5 with conical insertion region 6, two control holes 7, two cleaning holes 8, clamping device 10, actuating piston 11, spherical clamping members 12 of clamping device 10 and a section of monitoring line 40 can be seen from this representation. Actuating piston 11 is loaded in the direction of the bottom of clamping base 20 by means of compression springs (not shown) supported on clamping plate 2. An actuating piston 11 is shown together with clamping members 12 in the initial position, in which a clamping spigot can be introduced into receiving opening and also removed therefrom. A pressure space 27 is formed between the underside of actuating piston 11 and the bottom of clamping base 20. In order to move actuating piston 11 against the force of the compression springs into the initial position shown, space 27 is subjected to compressed air and a predetermined overpressure is built up. Actuating piston 11 is thus pressed pneumatically against the force of the compression springs against an upper stop and displaced into the initial position represented here. In order to clamp a palette on clamping chuck 1 by means of the clamping spigot, the overpressure in pressure space 27 must be reduced. For this purpose, pressure space 27 is preferably opened towards the atmosphere. As soon as the overpressure in pressure space 27 falls below a specific value, actuating piston 11 is moved by the compression springs downwards into its locking position. Clamping members 12 are displaced radially inwards into receiving opening 5, so that a clamping spigot inserted into receiving opening 5 is pulled further into the receiving opening, i.e., downwards in the direction of the bottom of clamping base 20 and is fixed or clamped in clamping chuck 1. Clamping device 10 is designed in such a way that actuating piston 11 together with clamping members 12 holds and locks the clamping spigot in clamping chuck 1 by means of self-locking. Such a clamping device 10 known per se is intended to ensure that the palette is and remains clamped in the unpressurized state of clamping chuck 1.

Clamping chuck 1 is also provided with a valve device 16, which forms a passage capable of being shut off in monitoring line 40. Valve device 16 comprises a valve housing 17 and an essentially cylindrical valve body 21 accommodated therein in sections. Valve housing 17 comprises a first outer part 18 and a second inner part 19, wherein outer part 18 is connected in a firmly bonded manner to actuating piston 11. Inner part 19 of the housing is connected in the axial direction in a form-fit manner to outer part 18, wherein inner part 19 is accommodated in outer part 18 with a radial play. Both valve housing parts 18, 19 are formed socket-like. Valve body 21 is mounted displaceably relative to valve housing 17 in order to change the flow of a fluid between a shut-off position and an open position. Air or compressed air is preferably used as a fluid. Valve body 21 is fixedly connected by means of screwing to clamping plate 2, whilst outer part 18 of valve housing 17 is fixedly accommodated in a hole 31 of actuating piston 11. Valve body 21 is provided with an axial inlet hole 22, which leads from the upper side into valve body 21 and leads, roughly in the middle of valve body 21, via a first radial hole 23 back out again. First radial hole 23 leads diametrically crosswise through valve body 21 and emerges on both sides from valve body 21. A second radial hole 24 is positioned in valve body 21, which is arranged below first hole 23 and also leads radially crosswise through valve body 21. This second radial hole 24 is connected to an axial outlet hole 25, which is led downwards out of valve body 21. The groove- or slot-shaped recess is provided in each case in the lateral surface of valve body 21 in the region of the two radial holes 23, 24. At the inner side, inner part 19 of valve housing 17 is provided with a recess, which forms an annular space surrounding valve body 21, the axial length whereof corresponds at least to the distance between the two radial through-holes 23, 24. Inner part 19 of valve housing 17 is led and accommodated in outer part 18 of valve housing 17 floating in the radial direction, i.e. with a degree of radial play in the order of magnitude of several tenths of a millimetre, whilst in the axial direction it is connected to outer part 18 of valve housing 17 in a form-fit manner with a degree of play. As a result of the floating bearing of inner part 19 of valve housing 17, the radial play of actuating piston 11 in particular, which is accommodated by reason of the system in the radial direction with a degree of play in clamping base 20, can be compensated, since in particular only inner part 19 of valve housing 17 in connection with valve body 21 is functionally important for the opening and closing of monitoring line 40.

The annular space arranged in inner part 19 of valve housing 17 is matched to valve body 21 in such a way that, in a predetermined first axial position of valve body 21 in relation to inner part 19, the two radial holes 23, 24 are connected to one another via the annular space, whilst in a predetermined second axial position, the two radial holes 23, 24 are not in connection with one another, since at least the one hole, but preferably both holes 23, 24, is or are located in the axial direction below the annular space in the region of an annular projection in inner part 19 limiting the annular space downwards. The latter-mentioned state arises when actuating piston 11 is in the represented initial position. In the locking position, on the other hand, the two radial holes 23, 24 are connected to one another via the annular space, as will be explained in greater detail below with the aid of FIG. 3. When the two radial holes 23, 24 are connected to one another via the annular space, valve device 16 is in the open position, i.e. the inlet of monitoring line 40 is connected pneumatically by valve device 16 to its outlet, since the annular space extends in the axial direction over the two radial holes 23, 24. To put it simply, monitoring line 40 is shut off by the valve device between the inlet and the outlet when actuating piston 11 is located outside the locking position, whilst monitoring line 40 is continuously open between the inlet and the outlet when actuating piston 11 is in the locking position.

Monitoring line 40 is also connected to at least one control line 15, which connects the two control holes 7 arranged in the conical insertion region 6 of the receiving opening to monitoring line 40. If a clamping spigot is not received in receiving opening 5, the two control holes are open, whereas the two control holes 7 are closed by the conical centring region of the clamping spigot when the clamping spigot is correctly received in the receiving opening. With this embodiment of the clamping chuck, it can be detected by the measured pressure at the outlet of monitoring line 40 whether the clamping spigot is correctly received in receiving opening 5 and whether locking piston 11 is in the locking position.

Figure 3:
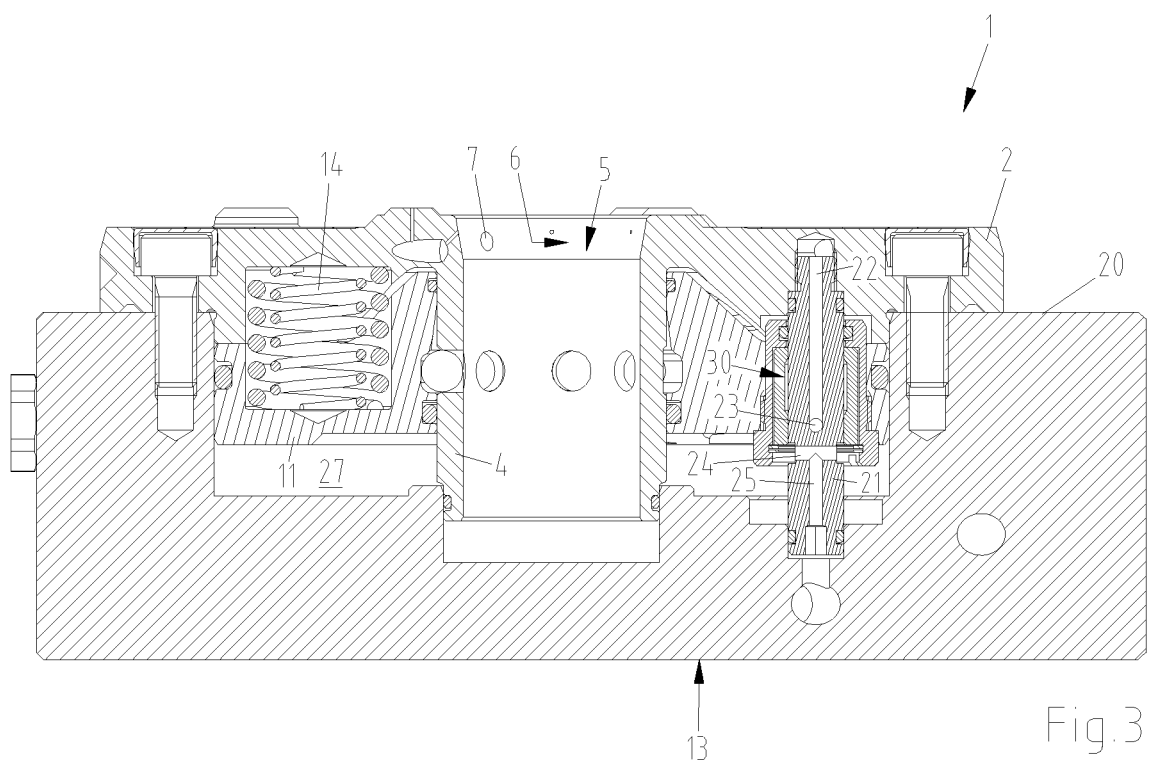
FIG. 3 shows the clamping chuck according to FIG. 1 in an alternative section.

FIG. 3 shows the clamping chuck according to FIG. 2 in an alternative section. In this representation, one of a plurality of compression springs 14 can be seen, which press actuating piston 11 downwards in the direction of its locking position. Moreover, inlet hole 22 leading from the upper side axially into valve body 21, first radial hole 23, second radial hole 24 and outlet hole 25 leading axially downwards out of valve body 21 can be seen. Annular space 30 surrounding valve body 21 can also be seen. In this state, in which actuating piston 11 is in its initial position displaced upwards, there is no passage between inlet hole 22 and outlet hole 25, since annular space 30 is located above the two radial holes 23, 24. An elevation of the inner housing part limiting annular space 30 downwards surrounds the lateral surface of valve body 21 above the two radial holes 23, 24. Apart from minor leakages via existing gaps, there is therefore no pneumatic connection between the two radial holes 23, 24.

Figure 4:
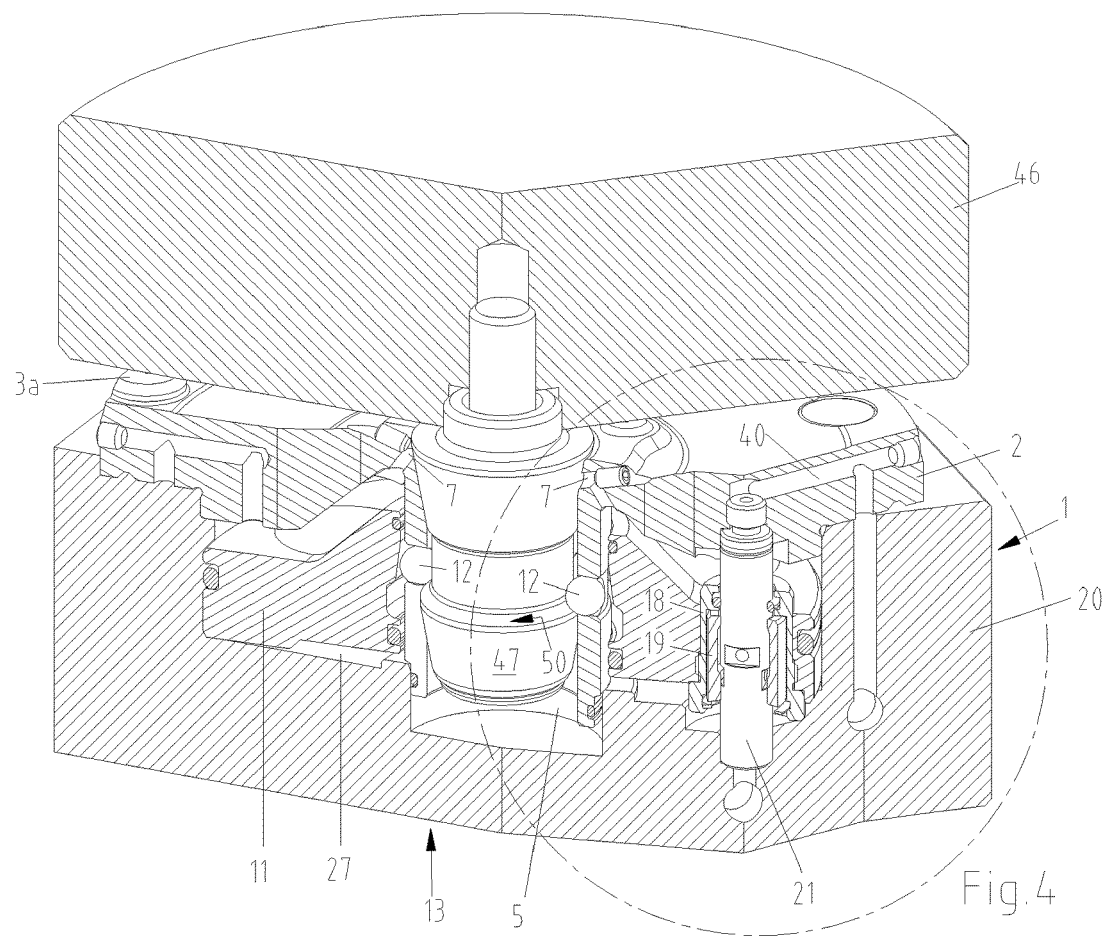
FIG. 4 shows the clamping chuck together with a palette clamped thereon in a partially cross-sectional and perspective view.

FIG. 4 shows clamping chuck 1 together with a palette 46 clamped thereon in a cross-section and in a perspective representation. Once clamping spigot 47 connected to palette 46 is inserted into receiving opening 5 and palette 46 is placed on clamping chuck 1, palette 46 is clamped on clamping chuck 1. The overpressure in pressure space 27 is reduced for this purpose, the pressure space preferably being opened to the atmosphere, so that its pressure falls to the ambient pressure. The effect of this is that actuating piston 11 is moved downwards under the effect of the compression springs into its active position. As actuating piston 11 is moved downwards, it presses clamping members 12 inwards, which then for their part abut against shoulder 50 of clamping spigot 47, and press clamping spigot 47 downwards towards the bottom of clamping base 20. Palette 46 lies with its underside on raised Z-supports 3a of clamping chuck 1. When actuating piston 11 is moved downwards, the valve housing is also moved, i.e., outer part 18 and inner part 19 relative to valve body 21, which is fastened to clamping plate 2 and does not perform any movement. As a result of this relative movement between inner part 19 of the valve housing and valve body 21, the valve device is moved into the open position, as will be explained in greater detail below with the aid of FIG. 6.

Figure 5:
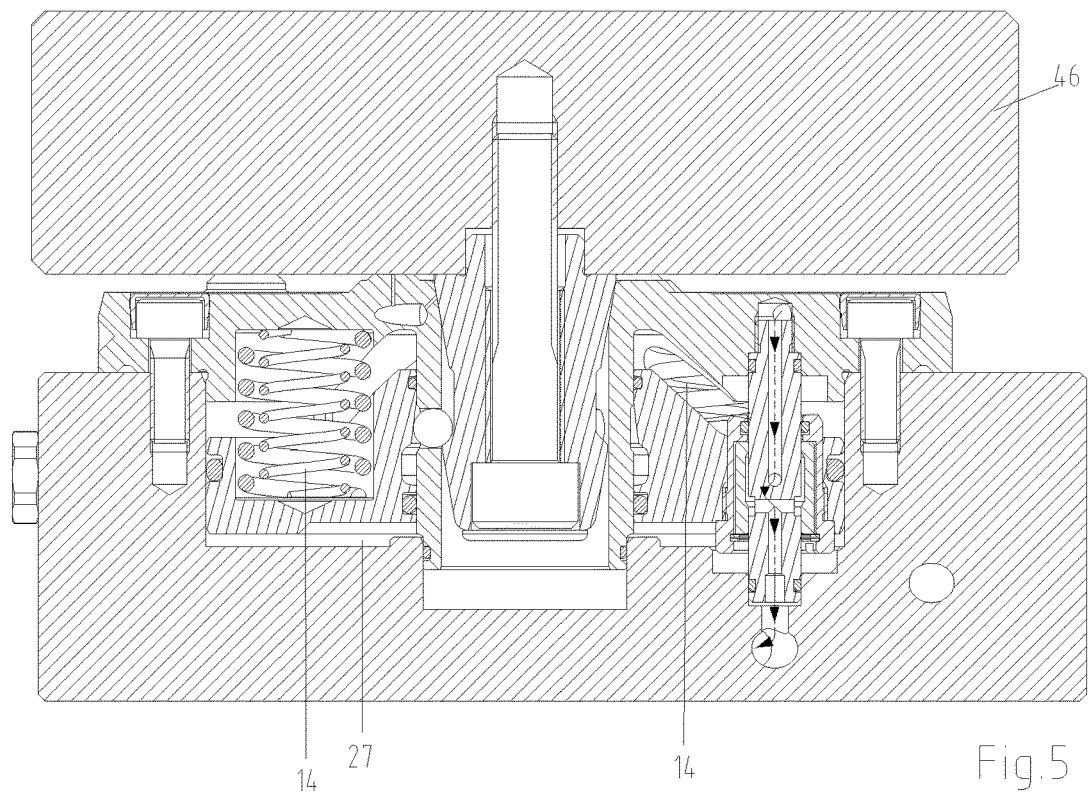
FIG. 5 shows the clamping chuck together with a palette clamped thereon according to FIG. 4 in an alternative section.

FIG. 5 shows the clamping chuck together with palette 46 clamped thereon according to FIG. 4 in a cross-section. Amongst other things, two of compression springs 14 can be seen from this representation, which press actuating piston 11 downwards into its final or locking position.

Figure 6:
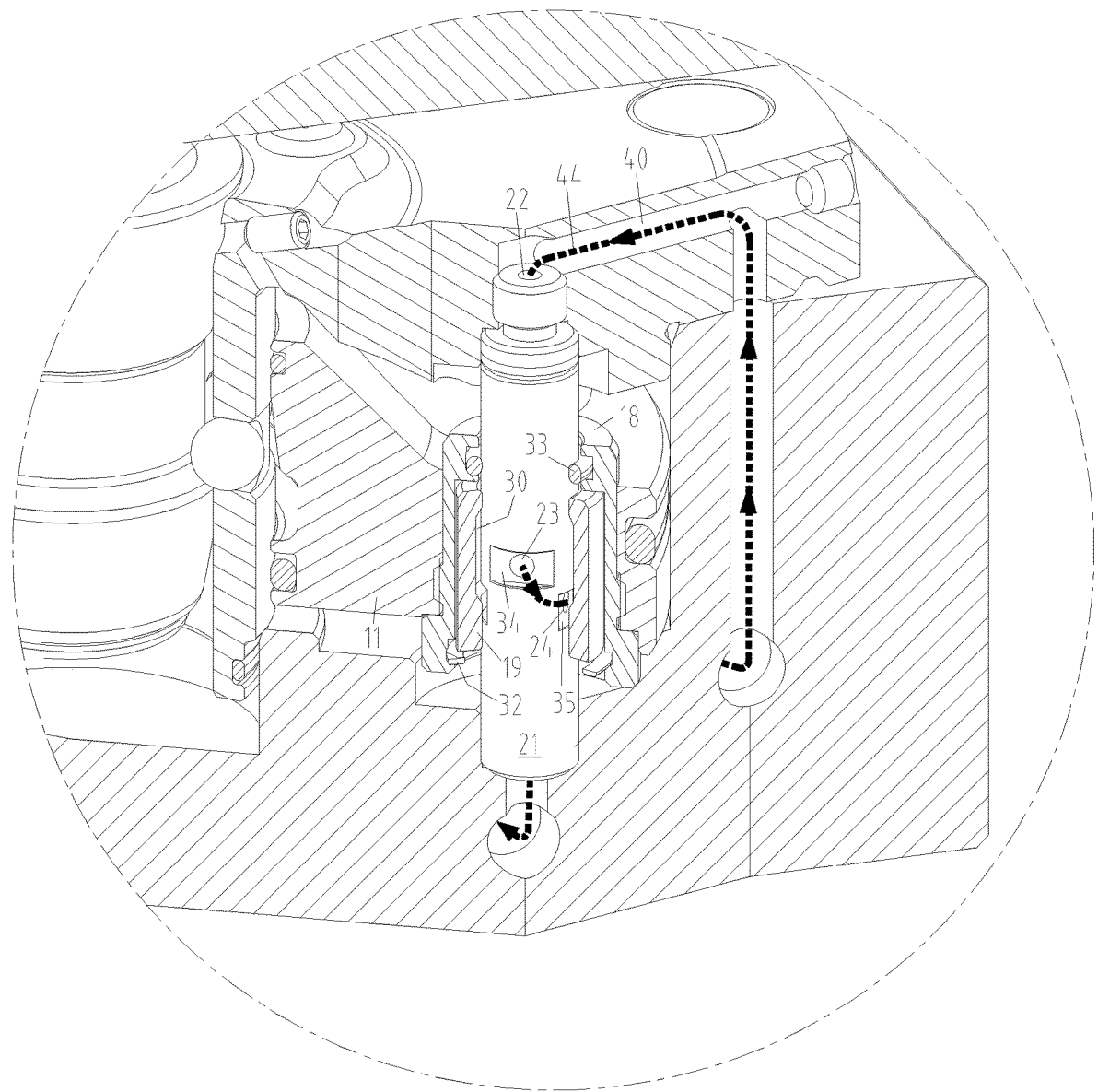
FIG. 6 shows an enlarged detail from FIG. 4.

FIG. 6 shows an enlarged detail from FIG. 4. In this representation, annular space 30 arranged in inner part 19 of the valve housing can be seen. When actuating piston 11 is pushed completely downwards, annular space 30 lies over the two radial holes 23, 24 of valve body 21. Due to the fact that annular space 30 lies over the two radial holes 23, 24 and valve body 21 is provided with groove-shaped slots 34, 35 in the region of radial holes 23, 24, there is a pneumatic connection between first 23 and second radial hole 24 and therefore between axial inlet hole 22 and the axial outlet hole of the valve body 21. In addition, it is indicated by a dashed line 44 with arrows that air flowing in from above from monitoring line 40 into valve body 21 can flow via annular space 30 from first radial hole 23 into second radial hole 24 and thus from axial inlet hole 22 into axial outlet hole 25 (FIG. 3). The air can flow onward from the axial outlet hole into monitoring line 40 in the direction of the outlet. In the lower region, outer part 18 of the valve housing is provided with a safety ring 32, which serves as an axial driver disc for inner part 19 of the valve housing when there is an outwardly directed movement of outer housing part 18. It can also be seen that outer part 18 of the valve housing is provided on its inner side with a sealing ring 33, which abuts in a sealing manner against the lateral surface of valve body 21.

Figure 7:
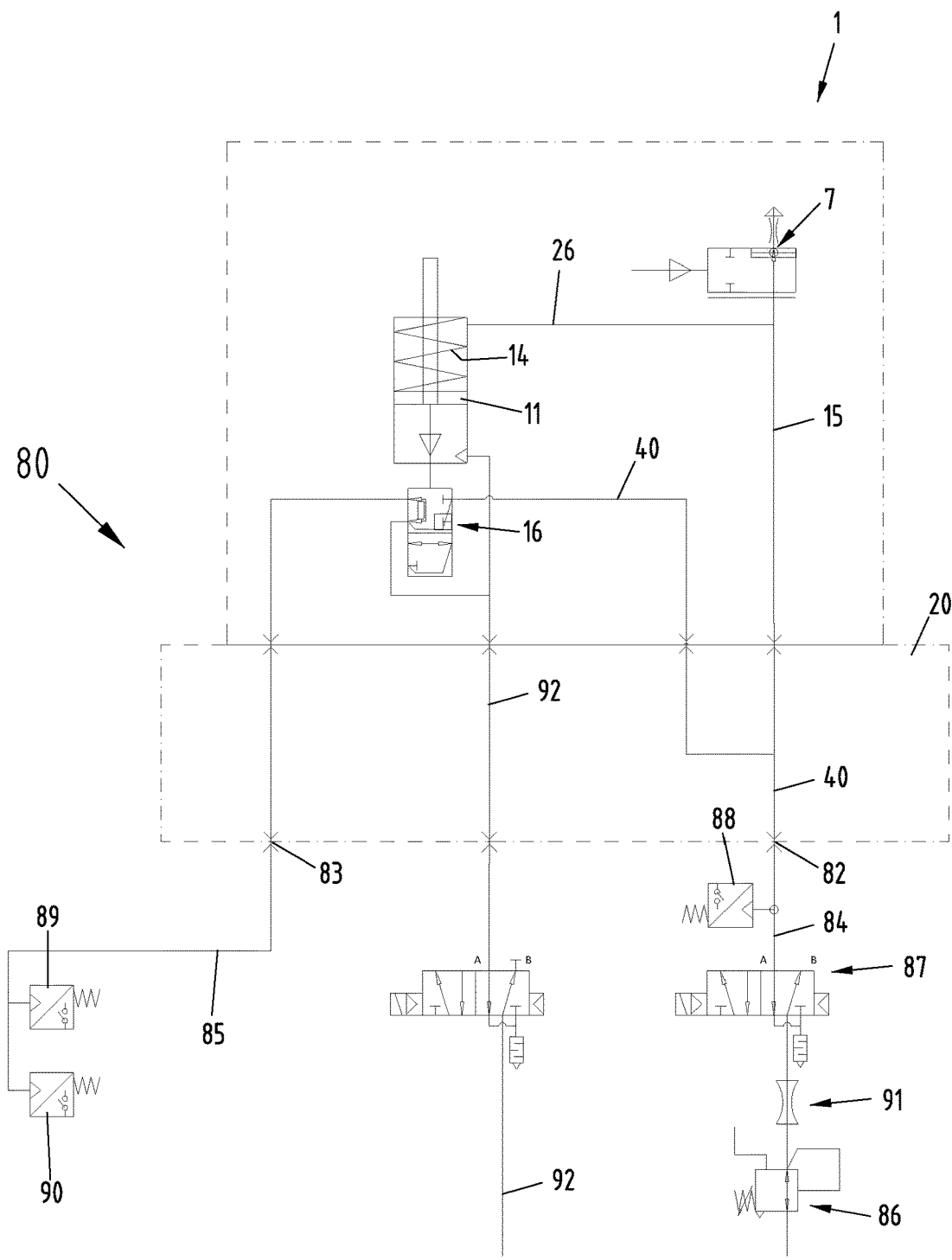
FIG. 7 shows, with the aid of a simplified diagram, a clamping chuck arrangement provided with the clamping chuck.

FIG. 7 shows, with the aid of a simplified diagram, previously explained clamping chuck 1 together with clamping base 20 and further elements of a clamping chuck arrangement 80 provided with clamping chuck 1. The aforementioned further elements are usually a component of or belong to the periphery of a processing machine on which the clamping chuck is used. Apart from clamping chuck 1, clamping chuck arrangement 18 comprises a first pressure sensor 88 connected at the inlet side to monitoring line 40 and two further pressure sensors 89, 90 connected at the outlet side to monitoring line 40. Monitoring line 40 leads from an inlet 82 into clamping base 20, wherein a control line 15 branches off from monitoring line 40 after inlet 82, which control line is also to be regarded as a component of monitoring line 40. This representation also represents diagrammatically actuating piston 11 of the clamping device, one of compression springs 14, valve device 16 serving to shut off monitoring line 40 and one of preferably two control holes 7 arranged in the receiving opening. A retightening line 26 branching off from control line 15 can also be seen, which leads into a retightening space arranged above actuating piston 11. If control line(s) 7 are closed by a clamping spigot, a sufficient pressure can be built up in monitoring line 40 by means of a pressure source connected at the inlet side, which can also be used for the retightening of actuating piston 11 in the locking position. Since the retightening of actuating piston 11 and the detection of the pressure at the outlet side can take place more or less simultaneously, the clamping chuck arrangement only needs to be provided for this purpose with in each case an inlet and outlet for monitoring line 40, which at the same time serves as a pneumatic retightening line.

Clamping chuck arrangement 80 also comprises numerous other elements such as for example a pressure control 86, control elements 87, a throttle 91 and a pneumatic pressure line 92. Space 27 beneath actuating piston 11 can be pressurized by means of pressure line 92, so that actuating piston 11 can be displaced against the force of compression springs 14 into its initial position. Pressure regulator 86 at the inlet side is connected via a line 84 to inlet 82, whilst a line 85 leads from outlet 83 to the two pressure sensors 89, 90 arranged in parallel at the outlet side. Further elements such as for example a pneumatic pressure source connected to line 84 or evaluation electronics are not shown in favour of a clearer representation. Both first pressure sensor 88 arranged at the inlet side and the two further pressure sensors 89, 90 connected at the outlet side to monitoring line 40 are connected to the evaluation electronics. Due to the fact that two pressure sensors 89, 90 are provided at the outlet side, a cross comparison of the pressure prevailing at the respective pressure sensor 89, 90 can be made and an error message can be outputted in the event of a deviation exceeding a specific limiting value. At all events, increased reliability can be achieved by means of the two pressure sensors 89, 90 arranged at the outlet side and a defective pressure sensor can be detected.

The functioning of clamping chuck arrangement 80 with regard to monitoring the presence and the correct clamping of a palette is explained in greater detail below with the aid of various variants, wherein it is assumed in the case of all the variants that pressure space 27 arranged beneath respective actuating piston 11 is not subjected to an overpressure.

Variant 1: No Palette Present

It is assumed with this variant that no palette and therefore no clamping spigot is received on clamping chuck 1 or in the receiving opening. In order to check whether a palette is correctly clamped in clamping chuck 1 by means of the clamping spigot, monitoring line 40 is subjected pneumatically to an overpressure via line 84 at the inlet side. After a predetermined time X, for example after 3-5 seconds, both the pressure prevailing at connecting line 84 at the inlet side, and also the pressure prevailing at connecting line 85 at the outlet side is measured with respective pressure sensors 88, 89, 90. If no clamping spigot is received in the receiving opening, the air flowing into monitoring line 40 escapes via control hole(s) 7 into the atmosphere. Since the quantity of air flowing into monitoring line 40 is limited by throttle 91 at the inlet side, only a small overpressure can be built up in monitoring line 40 when no clamping spigot is present, which at all events is well below the limiting value of approximately 4.5 bar defined for correct clamping.

The dimensioning of the throttle emerges from the ability of the air supply to maintain the inlet pressure, and from the line length and the line cross-section between control elements 87 and inlet 82. The throttle must therefore be closed so far that, even with short large lines and a very stable air supply, the absence of the clamping spigot leads to a significant fall in pressure and can be reliably detected by a low pressure at outlet 83. The throttle is thus set such that, in the absence of a clamping spigot and with a correctly locked clamping chuck, the pressure at outlet 83 is less than or equal to 2 bar.

In the absence of a clamping spigot, a pressure is thus set at the two pressure sensors 89, 90 arranged at the outlet side which is much lower than the pressure of for example 6 bar pre-set at the inlet side by means of pressure regulator 86. If actuating piston 11 is in the locking position, the valve body of valve device 16 is admittedly in the open position, but since the air flowing into monitoring line 40 escapes via control hole(s) 7, pressure sensors 89, 90 at the outlet side measure a pressure which is well below the set pressure of 6 bar. Measurements have shown that a pressure in the order of magnitude of approximately 1.5 to 2.5 bar prevails at the outlet side without a clamping spigot. It goes without saying that the pressure measured at the outlet side, aside from the overpressure set at the inlet side, depends on various other parameters such as for example the number and diameter of control hole(s) 7, the air volume fed in, leakage in the system, diameter of monitoring line 40, narrowing or throttle points between the inlet and the outlet etc. The diameter of control hole(s) 7 arranged in the insertion region of the clamping chuck is at all events selected such that on the one hand a sufficiently large quantity of air can escape via control hole(s) 7, so that a marked fall in pressure arises in the absence of a clamping spigot, that on the other hand control hole(s) 7 can be reliably sealed by means of the clamping spigot. It is particularly important that, by means of the pressure measured at the outlet side, a clear distinction can be made between a correctly clamped palette and an incorrectly clamped palette or a palette that is not present. The different states are preferably detected by means of tests and a pressure range is assigned to the respective state. Without throttle 91 at the inlet side, there would be the risk that, in the absence of a clamping spigot, there would not be a sufficiently large pressure difference between the inlet and outlet, since the measured outlet pressure could possibly be so high in the case of short lines and a large volume of air fed in that a reliable distinction could not be made between a clamping spigot being present and a clamping spigot not being present.

If no clamping spigot is received in the receiving opening and the volume of air flowing in is limited as described by the throttle on the inlet side, the pressure escapes via control hole(s) 7. It is irrelevant here whether valve device 16 or its valve body is located in the shut-off position or open position, since in both cases a pressure is present at pressure sensors 89, 90 arranged at the outlet side which is well below the nominal pressure of 6 bar. At all events, it is identified by means of the evaluation electronics not represented in detail that a pressure is present at the two pressure sensors 89, 90 which does not correspond to the overpressure of for example 4.5 bar or 450 kPa required for reliable clamping.

Variant 2: Palette Including Clamping Spigot is Present but Not Correctly Clamped It is assumed in this variant that a palette is lying on clamping chuck 1 and its clamping spigot is received in the receiving opening. If a clamping spigot is received in the receiving opening of the clamping chuck, control hole(s) 7 is/are closed by the conical centring region of the clamping spigot. As long as actuating piston 11 is not in the locking position, however, whereby for example it is jammed, valve device 16 occupies the locking position and a pressure again prevails at the two pressure sensors 89, 90 connected at the outlet side to monitoring line 40 which is much lower than the inlet nominal pressure of 6 bar set by means of pressure regulator 86. If the valve body of valve device 16 occupies the locking position, a pressure thus prevails at the two pressure sensors 89, 90 which essentially corresponds to the ambient pressure. However, on account of a certain leakage of valve device 16, the measured outlet pressure may certainly be somewhat higher than the ambient pressure; in any case, the pressure in connecting line 85 at the outlet side may however be below 2 bar.

In the event that actuating piston 11 is already in the locking position before a palette is placed on clamping chuck 1 and its clamping spigot is inserted into the receiving opening, the clamping spigot cannot be inserted completely into the receiving opening, since the clamping members are in the advanced locking position (FIG. 6), as result of which complete insertion of the clamping spigot is prevented, since front part 49 of clamping spigot 47 (FIG. 1) abuts against the clamping members and complete insertion is not possible. Control hole(s) 7r are also not closed by the clamping spigot and the pressure generated at the inlet side can escape via control hole(s) 7. In this case too, a pressure prevails at the two pressure sensors 89, 90 at the outlet side which lies below 2 bar. In this case too, it is detected by means of the evaluation electronics that correct clamping and locking of a palette has not taken place.

Variant 3: Palette Correctly Clamped in the Clamping Chuck

It is assumed in this variant that the palette is lying on clamping chuck 1 and its clamping spigot is clamped by means of the clamping device and correctly locked. Actuating piston 11 is in a lower locking position, in which it presses the clamping members inwards into the receiving opening. The clamping members abut against the shoulder of the clamping spigot and pull the latter together with the palette downwards with a strong force, so that the underside of the palette lies fixedly on the raised Z-supports of clamping chuck 1. All of control holes 7 arranged in the insertion region of the receiving opening are thus also tightly sealed by the conical centring region of the clamping spigot. In the locking position of actuating piston 11, the two radial holes 23, 24 are connected to one another in valve body of the valve device via annular space 30 of inner part 19 (FIG. 6) of the valve housing. Inlet 82 of monitoring line 40 is thus connected to its outlet 83.

Taking account of the leakage of the system, when a clamping spigot is correctly locked, a pressure in the order of magnitude of approximately 4.5 to 5.5 bar prevails at the two pressure sensors 89, 90 connected at the outlet side to monitoring line 40, when a nominal pressure of 6 bar is set at the inlet side by means of pressure regulator 86. In order to identify correct clamping of the palette, it is necessary on the one hand, by means of the two pressure sensors 89, 90 at the output side, to measure a pressure which amounts to at least 75% of the pressure set and possibly measured at the inlet side. In addition, a pressure difference of at most 10% may be present and measured at the two pressure sensors 89, 90 connected at the outlet side to monitoring line 40, because otherwise an error message is outputted and/or defective clamping of the palette is detected.

If monitoring line 40 had no leakage, but was completely sealed, the set nominal pressure of 6 bar would in theory be present at pressure sensors 89, 90 arranged at the outlet side in the monitoring line after a certain time, i.e., when the pressure had fully built up in monitoring line 40. However, since such pneumatic systems have a certain amount of leakage, a pressure prevails at the outlet which is up to approximately 25% lower than the set nominal pressure. If the pressure difference between inlet 84 and outlet 85 amounts to less than 25%, correct clamping of the palette is identified, whereas defective clamping of the palette is identified with a pressure difference between inlet 84 and outlet 84 of more than 25%. In the present case, however, the system is designed such that the pressure difference between inlet 84 and outlet 85 amounts to approximately 50% when the clamping spigot is absent.

It can thus be determined that, in the case of correct clamping and locking of a palette provided with a clamping spigot, with an inlet pressure of 6 bar, a pressure in the order of magnitude of approximately 4.5 to 5.5 bar prevails at the two pressure sensors 89, 90 arranged at the outlet side in the monitoring line, whereas in the case of a clamping spigot not being present or incorrect locking of the same, a pressure of less than 3 bar prevails. This difference is however sufficiently large to be able to decide by means of evaluation electronics whether a palette is correctly clamped or not. Whereas the stated difference, in particular of the pressure measured at the outlet, should preferably be classed in the maximum range in the case of a new clamping chuck, this difference in the case of long-term use of the clamping chuck may perhaps be somewhat smaller, wherein measurements have shown that even after over 50,000 clamping procedures the difference is still sufficiently large to be able to reliably distinguish whether a palette is clamped correctly or not.

Figure 8:
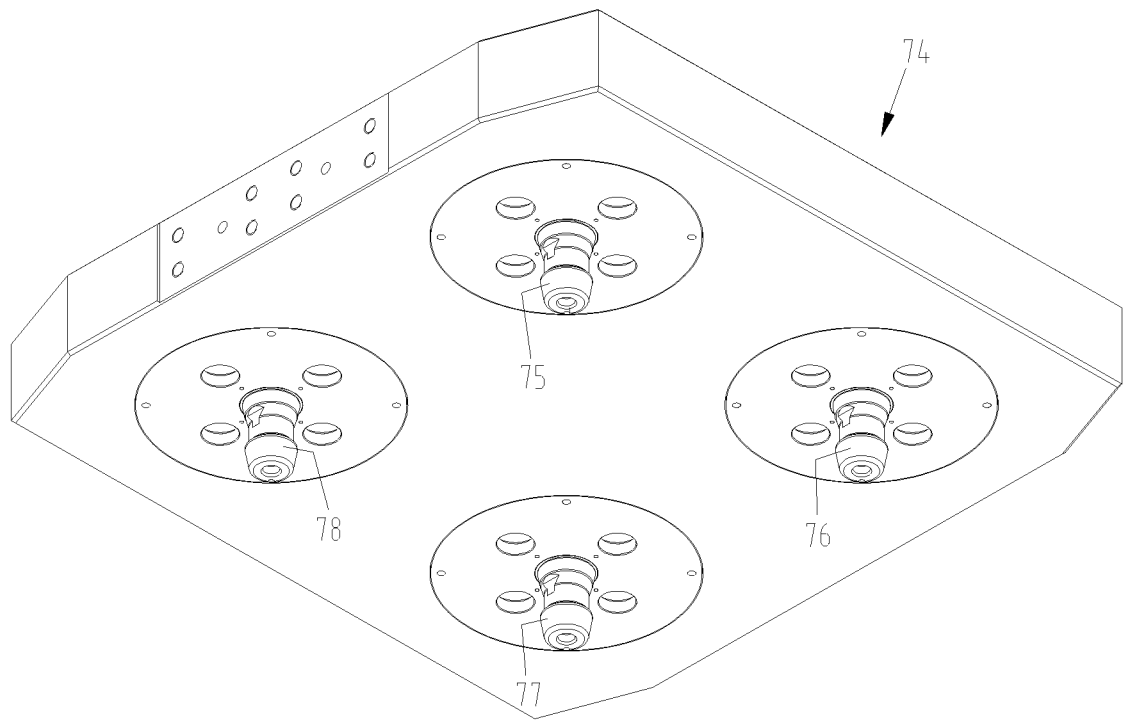
FIG. 8 shows a clamping device provided with four clamping chucks.
Figure 8:
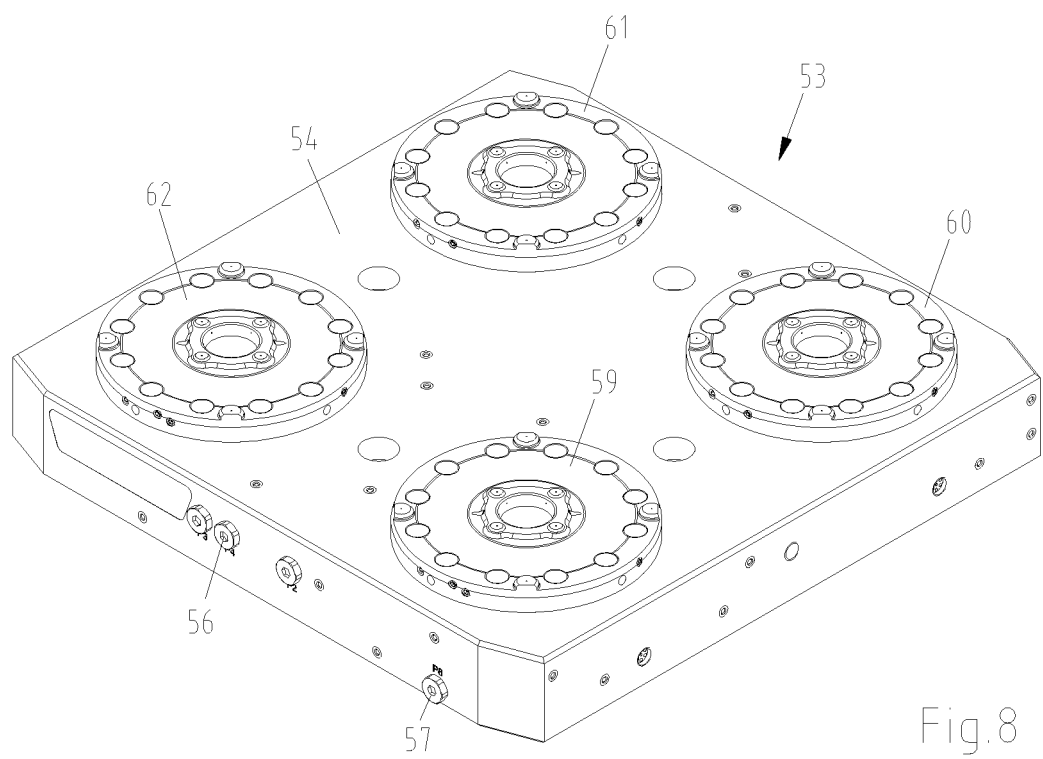

FIG. 8 shows a further example of embodiment of the invention, i.e., a clamping device 53, with a clamping base 54 comprising four clamping chucks 59, 60, 61, 62 for clamping a workpiece carrier 74. Each of clamping spigots 59, 60, 61, 62 is designed according to the previously explained example of embodiment, for which reason respective clamping chuck 59, 60, 61, 62 as such will no longer be dealt with in detail below. Workpiece carrier 74 is provided on its underside with four clamping spigots 75, 76, 77, 78 arranged corresponding to clamping chucks 59, 60, 61, 62. During clamping on clamping device 53, the underside of workpiece carrier 74 rests on the Z-supports of respective clamping chuck 59, 60, 61, 62. In clamping base 54, a monitoring line again runs from a coupling 57 arranged at the inlet side to a coupling 56 arranged at the outlet side.

The four valve devices of the four clamping chucks 59, 60, 61, 62 are connected to one another in series, i.e., the outlet of the first valve device is connected to the inlet of the second valve device, the outlet of which is connected to the inlet of the third valve device, whilst the outlet of the third valve device is connected to the inlet of the fourth valve device. The inlet of the first valve device is connected to the inlet of the monitoring line, whilst the outlet of the fourth valve device is connected to the outlet of the monitoring line. The inlet of the monitoring line is thus connected to the outlet of the monitoring line via the four valve devices connected to one another in series. A further line branches off from the monitoring line between its inlet and the first valve device, from which line the fourth control lines in turn branch off, which lead to the control hole(s) arranged in the insertion region of respective clamping chuck 59, 60, 61, 62. All the control holes are thus connected to one another in parallel.

FIG. 9 shows, with the aid of a simplified diagram, further elements of a second clamping chuck arrangement 81 provided with previously explained clamping device 53. The aforementioned further elements are again a component of or belong to the periphery of a processing machine, on which clamping device 52 is used. In this example, it is assumed that a processing machine is used such as has already been explained with the aid of FIG. 7. The elements and lines provided at the machine side thus have the same reference numbers as in first clamping chuck arrangement 80. Clamping device 53 comprises four clamping chucks 59, 60, 61, 62 arranged on clamping base 54.

The monitoring line leading from inlet 82 to outlet 83 through clamping device 53 has reference number 40 at the inlet side. Individual partial sections of the monitoring line are provided with reference numbers 40a-40e.

Apart from clamping device 53, second clamping chuck arrangement 81 again comprises a first pressure sensor 88 connected at the inlet side to monitoring line 40 and two further pressure sensors 89, 90 connected at the outlet side to monitoring line 40e. Each of the four clamping chucks 59, 60, 61, 62 is provided with an actuating piston loaded by means of compression springs and a valve device 69, 70, 71, 72 in each case. At least one control hole 7 again emerges in each case into the receiving opening of respective clamping chuck 59, 60, 61, 62, but preferably two control holes 7 are provided per clamping chuck 59, 60, 61, 62. As further elements of clamping chuck arrangement 81, a pressure regulator 86, control elements 87, a throttle 91 and a pressure line 92, via which the space beneath respective actuating piston 11 can be pressurized, can again be seen. Pressure regulator 86 on the inlet side is connected via line 84 to inlet 82, whilst line 85 leads from outlet 83 to two pressure sensors 89, 90 arranged in parallel at the outlet side. Further elements such as for example the evaluation electronics are not represented in favour of a clearer representation. Both pressure sensor 88 on the inlet side and also the two pressure sensors 89, 90 connected at the outlet side to the monitoring line are connected to the evaluation electronics.

Monitoring line 40 is connected to control holes 7 of all clamping chucks 59, 60, 61, 62. For this purpose, a connecting line 40a branches off from monitoring line 40 after inlet 82, wherein connecting line 40a is also to be regarded as part of monitoring line 40. A control line 64, 65, 66, 67 again branches off from this connecting line 40a in each case in the region of respective clamping chuck 59, 60, 61, 62, which control line leads to control hole 7 or to the control holes of associated clamping chuck 59, 60, 61, 62. As can be seen with the aid of first clamping chuck 59, a line also leads from respective control line 64 into the space above actuating piston 11 of clamping chuck 59. Monitoring line 40 can thus also be used in order to load actuating piston 11 downwards in the direction of its locking position, which can be used in particular for the retightening of respective locking piston 11 after the clamping of a clamping spigot. It is important however that no compressed air is conveyed into the retightening space, as long as the clamping chuck is to remain open. If a clamping spigot is received in each clamping chuck 59, 60, 61, 62, a sufficient pressure can be built up in monitoring line 40 and all actuating pistons 11 can also be simultaneously retightened by the introduction of compressed air. In the reverse case, an already present "retightening line", such as is often already provided with generic clamping devices, can also be used to check the presence of the clamping spigots. For this purpose, clamping chucks 59, 60, 61, 62 must be designed according to the invention and the corresponding lines must be connected to the retightening line.

It can also be seen that that the four valve devices 69, 70, 71, are connected to one another in series and inlet 82 of monitoring line 40 is connected via the four valve devices 69, 70, 71, 72 to outlet 83 of monitoring line 40. For this purpose, connecting line 40a is connected to the inlet of first valve device 69 in the region of first clamping chuck 59. The outlet of first valve device 69 is connected via line 40b to the inlet of second valve device 70, the outlet of which is connected via line 40c to the inlet of third valve device 71. The outlet of third valve device 71 is connected via line 40d to the inlet of fourth valve device 72. Line 40e leads from the outlet of forth valve device 72, which is also to be regarded as part of monitoring line 40, to outlet 83.

The functioning of clamping chuck arrangement 81 with regard to monitoring the presence and the correct clamping of a palette is basically the same as in the previously described example, with the difference that all clamping chucks 59, 60, 61, 62 are monitored. Various variants are again explained below, wherein reference is made only in part to the reference numbers of first clamping chuck 59, since the four clamping chucks are designed identically. It is assumed in the case of all the variants that pressure space 27 arranged below respective actuating piston 11 is not subjected to overpressure.

Variant 1: No Palette Present

It is assumed in this variant that no palette is placed on clamping device 53. Without a palette, a clamping spigot is also not received in any of clamping chucks 59, 60, 61, 62. In order to check whether a palette is clamped correctly on clamping device 53 by means of the four clamping spigots, monitoring line 40 is pneumatically subjected to overpressure via connecting line 84 at the inlet side. If a clamping spigot is not received in any of clamping chucks 59, 60, 61, 62, the air flowing into monitoring line 40 escapes via control hole(s) 7 of respective clamping chuck 59 into the atmosphere. Since the quantity of air flowing into monitoring line 40 is limited by throttle 91 at the inlet side, only a small overpressure can be built up in monitoring line 40 if at least one of the clamping spigots is absent, which overpressure at all events lies well below the limiting value of approximately 4.5 bar defined for correct clamping. A pressure is thus present at the two pressure sensors 89, 90 connected at the outlet side to monitoring line 40e which is significantly lower than the pressure of 6 bar set at the inlet side by means of pressure regulator 86. If actuating piston 11 of respective clamping chuck 59 is in the locking position, the valve body of respective valve device 69, 70, 71, is in the open position, but since the air flowing into monitoring line 40 escapes via control holes 7, pressure sensors 89, 90 at the outlet side measure a pressure which is far below the set pressure of 6 bar. The pressure measured at the outlet side, as already mentioned previously, is dependent on various further parameters. It is also important here, however, that a clear distinction can be made between a correctly clamped palette and an incorrectly clamped palette or one that is not present by means of the pressure measured at the outlet side. In the case of this clamping device 53, the different states are also preferably identified by means of tests and a pressure range is assigned to the given state. At all events, it can be detected by means of the evaluation electronics (not represented in detail here) that in variant 1 a pressure prevails at the two pressure sensors 89, 90 which does not correspond to the overpressure of at least 4.5 bar or 450 kPa required for secure clamping.

Variant 2: Palette Present, but at Least One Clamping Spigot is Absent

It is assumed in this variant that a palette lies on the clamping device, but at least one clamping spigot is absent, as a result of which no clamping spigot is received in at least one of clamping chucks 59, 60, 61, 62. In this case too, the introduced compressed air escapes via the control hole(s) of the clamping chuck in which no clamping spigot is received. Since the quantity of air flowing into monitoring line 40 is limited by throttle 91 at the inlet side, only a small overpressure can again be built up in monitoring line 40 when a clamping spigot is absent.

The throttle is dimensioned such that, with precisely one absent clamping spigot and correctly locked clamping chucks, the pressure of the outlet 83 is less than or equal to 2 bar.

In this case too, therefore, irrespective of the position of actuating piston 11 and respectively associated valve device 69, 70, 71, 72, a pressure is measured by the two pressure sensors 89, 90 at the outlet side which lies below approximately 2 bar. It is thus detected by means of evaluation electronics that a pressure is present at the two pressure sensors 89, 90 which does not correspond to the overpressure required for secure clamping.

Variant 3: Palette Including All the Clamping Spigots Present, but not Correctly Clamped It is assumed in this variant that a palette provided with four clamping spigots lies on the four clamping chucks 59, 60, 61, 62 of clamping device 53 and all four clamping spigots are received in the receiving opening of respective clamping chuck 59, 60, 61, 62. The control hole(s) of the respective clamping chuck is/are closed by the respective clamping spigot. However, as long as at least one actuating piston is not in the locking position, in that for example actuating piston 11 of first clamping chuck 59 is for example jammed, associated valve device occupies the shut-off position and the passage in the monitoring line is blocked at the corresponding point. Since the four valve devices 69, 70, 71, 72 are connected to one another in series, a pressure again prevails at the two pressure sensors 89, 90 connected at the outlet side to monitoring line 40, which is significantly lower than the inlet pressure of 6 bar set by means of pressure regulator 86. If at least one of the four valve devices 69, 70, 71, 72 occupies the shut-off position, a pressure prevails at the two pressure sensors 89, 90 which essentially corresponds to the ambient pressure, but at all events lies below 2 bar. It is thus identified by means of the evaluation electronics that reliable clamping of the workpiece carrier has not taken place.

In the event that at least one of actuating pistons 11 of the four clamping chucks 59, 60, 61, 62 is already in the locking position before a palette is placed on clamping device 53 and its clamping spigot is inserted into the receiving opening of respective clamping chuck 59, 60, 61, 62, the clamping spigot at the clamping chuck which is in the locking position cannot be inserted completely into the receiving opening, as has already been explained previously with the aid of FIG. 7 (variant 2). In this case too, it is identified by means of the evaluation electronics that secure clamping of the workpiece carrier has not taken place.

Variant 4: Palette Clamped by Means of All the Clamping Spigots Correctly in the Clamping Chuck It is assumed in this variant that the palette is lying on clamping device 53 and the four clamping spigots are clamped by means of the four clamping chucks 59, 60, 61, 62 and correctly locked. The actuating piston of the respective clamping chuck is in its lower locking position, in which it presses the clamping members inwards into the receiving opening. The clamping members abut against the shoulder of the respective clamping spigot and draw the latter together with the palette downwards with a strong force, so that the underside of the palette lies fixedly on the raised Z-supports of the four clamping chucks 59, 60, 61, 62 of clamping device 53. All of control holes 7 arranged in the insertion region of the respective receiving opening are thus tightly closed by the conical centring region of the corresponding clamping spigot. Since actuating pistons 11 of all four clamping chucks 59, 60, 61, 62 are in the locking position, the two radial holes in the respective valve body are also connected to one another via the annular space of the inner insert (FIG. 6) and all four valve devices 69, 70, 71, 72 are in the open position. Inlet side 82 of monitoring line 40 is thus connected via the four valve devices 69, 70, 71, 72 to their outlet side 83.

Taking account of the leakage of the system, a pressure in the order of magnitude of approximately 4.5 to 5.5 bar prevails at the two pressure sensors 89, 90 arranged at the outlet side in the monitoring line when there is correct locking of the four clamping spigots and the evaluation electronics identifies correct clamping of the palette.

To sum up, it can be stated that, in the case of correct clamping and locking of the palette provided with four clamping spigots, with an inlet pressure of 6 bar, a pressure in the order of magnitude of approximately 4.5 to 5.5 bar prevails at the two pressure sensors 89, 90 arranged at the outlet side in the monitoring line, whereas a pressure of less than 2 bar prevails if at least one clamping spigots is absent or correct locking of at least one clamping spigot is not present. With the aid of this difference, it can be reliably identified by means of the evaluation electronics whether the palette has been clamped correctly or not. Here too, it can again be mentioned that, in the case of a correctly clamped palette, the pressure at the outlet, with a new clamping chuck, can preferably be classed in the upper range, i.e., between approximately 5 and 5.5 bar, whereas after several thousand or tens of thousands of the clamping procedures it tends to be somewhat lower and may lie at approximately 4.5 to 5 bar. In any case, however, the pressure prevailing at the outlet side in the case of the correct clamping of a palette is still sufficiently large to be able to reliably decide that the palette is also clamped correctly.

The compressed air fed into monitoring line 40 can moreover be used to clean contact surfaces on the underside of the palette and/or on the clamping spigot by means of blowing off. For this purpose, at least one valve must be provided, by means of which the compressed air introduced into monitoring line 40 is deflected to cleaning holes 8 (FIG. 1). Since clamping systems designed according to the prior art are usually already provided with a pneumatic coupling or a pneumatic connection for introducing compressed air for blowing-off/cleaning the contact surfaces, existing processing machines can also be retrofitted comparatively easily. In the case of clamping systems designed according to the prior art, a pneumatic coupling or a pneumatic connection is also usually provided at the outlet side, which is connected to the outlet of the one and/or other line.

It goes without saying that the previous example of embodiment is not conclusive, but that within the scope of the invention diverging embodiments are certainly possible. Thus, for example, instead of two control holes, a number of control holes per clamping chuck diverging therefrom could be provided. The provision of at least two control holes per clamping chuck has the advantage that an increased volume flow is achieved when a clamping spigot is absent and therefore a greater measurable ΔP is achieved.

Even though only clamping systems with one or four clamping chucks have previously been explained, clamping systems with two, three, five or more clamping chucks can of course also be designed according to the invention and the correct clamping of a palette can be monitored.

In that the throttle is dimensioned such that, with precisely one absent clamping spigot and a correctly locked clamping chuck or correctly locked clamping chucks, the pressure at outlet 83 is less than or equal to 2 bar, a pressure is measured at the outlet side with at least one absent clamping spigot which is less than or equal to 2 bar. Irrespective of the number of clamping chucks, a pressure is always measured up the outlet side which is less than or equal to 2 bar was at least one absent clamping spigot.

Several advantages of the clamping chuck designed according to the invention are briefly summarised below:
- With a clamping chuck designed according to the invention, the correct clamping of a palette in the clamping chuck can be reliably monitored;
- The absence of the clamping spigot, and therefore of the palette, can also be reliably detected;
- In the case of a clamping device provided with a plurality of clamping chucks for clamping a palette provided with a plurality of clamping spigots, both the presence of all the clamping spigots and also their correct clamping can be reliably monitored;
- A clamping chuck designed according to the invention or a clamping device designed according to the invention are suitable for long-term use and function in a stable manner in the long term;
- Comparatively few mechanical components need to be provided;
- Existing processing machines can be retrofitted or equipped comparatively easily and cost-effectively with a clamping chuck designed according to the invention or a clamping device designed according to the invention.

| | |
|---|---|
| 1. | Clamping chuck |
| 2. | Clamping plate 2 |
| 3. | 3a inner Z-supports/3b outer Z-supports |
| 4. | Hollow-cylindrical extension |
| 5. | Receiving opening |
| 6. | Insertion region (conical) |
| 7. | Control hole |
| 8. | Cleaning hole |
| 9. | Couplings |
| 10. | Clamping device |
| 11. | Actuating piston |
| 12. | Clamping members (spheres) |
| 13. | |
| 14. | Compression spring |
| 15. | Control line |
| 16. | Valve device |
| 17. | Valve housing |
| 18 | Outer part (valve housing) |
| 19. | Inner part (valve housing) |
| 20. | Clamping base |
| 21. | Valve body |
| 22. | Axial inlet hole |
| 23. | First radial hole |
| 24. | Second radial hole |
| 25. | Axial outlet hole |
| 26. | Retightening line |
| 27. | Space beneath actuating piston |
| 28. | Space above actuating piston (retightening) |
| 29. | |
| 30. | Annular space |
| 31. | Hole actuating piston |
| 32. | Snap ring |
| 33. | Seal |
| 34. | Slot-shaped cutout |
| 35. | Slot-shaped cutout |
| 36. | Stepped hole base body |
| 37. | Upper seal valve body |
| 38. | Lower seal valve body |
| 39. | Seal outer socket |
| 40. | Monitoring line |
| 41. | Inlet monitoring line |
| 42. | Outlet monitoring line |
| 43. | Branch-off from monitoring line |
| 44. | Dashed line |
| 45. | |
| 46. | Palette |
| 47. | Clamping spigot |
| 48. | Rear centring region |
| 49. | Front part |
| 50. | Shoulder |
| 51. | |
| 52. | |
| 53. | Clamping device |
| 54. | Clamping base |
| 55. | Housing clamping base |
| 56. | Coupling inlet |
| 57. | Coupling outlet |
| 58. | |
| 59. | First clamping chuck |
| 60. | Second clamping chuck |
| 61. | Third clamping chuck |
| 62. | Forth clamping chuck |
| 63. | |
| 64. | First control line |
| 65. | Second control line |
| 66. | Third control line |
| 67. | Forth control line |
| 68. | |
| 69. | First valve device |
| 70. | Second valve device |
| 71. | Third valve device |
| 72. | Fourth valve device |
| 73. | |
| 74. | Workpiece carrier |
| 75. | First clamping spigot |
| 76. | Second clamping spigot |
| 77. | Third clamping spigot |
| 78. | Forth clamping spigot |
| 79. | |
| 80. | First clamping chuck arrangement |
| 81. | Second clamping chuck arrangement |
| 82. | Inlet |
| 83. | Outlet |
| 84. | Connecting line inlet side |
| 85. | Connecting line outlet side |
| 86. | Pressure regulator |
| 87. | Control elements |
| 88. | Pressure sensor inlet side |
| 89. | First pressure sensor outlet side |
| 90. | Second pressure sensor outlet side |
| 91. | Throttle |

| | |
|---|---|
| 92. | Pressure line release locking |
| 93. | Outlet |
| 94. | |
| 95. | |
| 96. | |
| 97. | |
| 98. | |
| 99. | |
| 100. | |

The invention claimed is:

1. A clamping chuck for clamping a palette having a clamping spigot, the clamping chuck comprising:
a receiving opening configured to receive the clamping spigot; and
a clamping device including clamping members configured and arranged for clamping the clamping spigot within the receiving opening,
wherein the clamping chuck includes a fluid monitoring line which leads from an inlet to an outlet, said inlet connectable to a source of pressurized fluid,
wherein the receiving opening includes a conical insertion region, into which at least one control hole in fluid connection to the monitoring line emerges, and
wherein said control hole is in fluid communication with said monitoring line between said inlet and said outlet, and is configured and arranged to be closed by the clamping spigot when received in the receiving opening.

2. The clamping chuck according to claim 1, wherein the clamping device further includes an actuating piston displaceable between an initial position and a locking position for the purpose of actuating the clamping members, wherein the clamping chuck includes a valve device arranged between the inlet and the outlet of the monitoring line, said valve device configured and operable to vary the flow of a fluid through the monitoring line depending on the position of the actuating piston.

3. The clamping chuck according to claim 2, wherein the valve device includes a valve housing and a valve body accommodated at least in sections therein, wherein the valve housing and valve body can be displaced relative each other between a shut-off position and an open position in order to change the flow of the fluid.

4. The clamping chuck according to claim 3, wherein one of the valve body and the valve housing is coupled with the actuating piston, in such a way that the valve device is in the open position when the actuating piston is displaced correctly into the locking position, whereas the valve device is in the shut-off position when the actuating piston is not displaced correctly into the locking position.

5. The clamping chuck according to claim 3, wherein the valve body is arranged stationary, whilst the valve housing is connected firmly bonded to the actuating piston.

6. The clamping chuck according to claim 5, wherein the valve housing includes a first outer part and a second inner part, wherein the outer part is fixed to the actuating piston, whilst the inner part is connected in the axial direction in a form-fit manner to the outer part, and wherein the inner part is accommodated with radial play in the outer part.

7. The clamping chuck according to claim 3, wherein an axial inlet hole leads from the upper side into the valve body and an axial outlet hole leads from the underside into the valve body, wherein the axial inlet hole emerges into a first radial through-hole and wherein the axial outlet hole emerges into a second radial through-hole, and wherein the first radial through-hole runs above the second radial through-hole, and wherein the inner part of the valve housing is provided with an annular space, the axial length of which corresponds at least to the distance between the two radial through-holes, and wherein the annular space extends over the two radial holes when the actuating piston is in its locking position.

8. The clamping chuck according to claim 2, wherein the monitoring line is continuously open between the inlet and the outlet, but is closed with respect to the atmosphere, when the clamping spigot is received in the receiving opening of the clamping chuck and is correctly locked by means of the clamping device.

9. The clamping device according to claim 8, wherein the monitoring line is continuously open between the inlet and the outlet, but is closed with respect to the atmosphere, when the clamping spigot is received in the receiving opening of each clamping chuck and is correctly locked by means of the respective clamping device.

10. A clamping device comprising:
at least two clamping chucks for clamping a palette according to claim 1; and
a number of clamping spigots corresponding to the number of clamping chucks, wherein the clamping chucks are accommodated in a common clamping base and the clamping base is provided with the fluid monitoring line, which monitoring line is connected to all the control holes arranged in the insertion region of the respective clamping chuck.

11. The clamping device according to claim 10, wherein each clamping chuck includes a valve device, by means of which the flow of a fluid through the monitoring line can be varied depending on the position of the respective actuating piston, wherein the valve devices are arranged between the inlet and the outlet of the monitoring line and are connected to one another in series, in such a way that a passage between the inlet and the outlet of the monitoring line exists only when all the actuating pistons are correctly locked.

12. The clamping device according to claim 10, wherein, in the region of the respective clamping chuck, a pneumatic retightening line leads into a retightening space arranged above the respective actuating piston, wherein each retightening line is connected directly or indirectly to the monitoring line.

13. A clamping chuck arrangement comprising:
a clamping device according to claim 10; and
an inlet line which can be connected to a source of pressurized fluid, which is connected to the inlet of the monitoring line, wherein the monitoring line is connected at the outlet side to an outlet line and the outlet line is connected to at least one pressure sensor for detecting the pressure.

14. A clamping chuck arrangement comprising:
a clamping chuck according to claim 1; and
an inlet line which can be connected to a source of pressurized fluid, which is connected to the inlet of the monitoring line, wherein the monitoring line is connected at the outlet side to an outlet line and the outlet line is connected to at least one pressure sensor for detecting the pressure.

15. The clamping chuck arrangement according to claim 14, wherein a throttle limiting the flowing quantity of air is arranged in the inlet line, wherein the inlet line is connected to a first pressure sensor and the outlet line is connected to a second and a third pressure sensor for detecting the pressure prevailing in the monitoring line at the outlet side, and wherein the clamping chuck arrangement includes evaluation electronics for recording and evaluating the pressures determined by means of the three pressure sensors.

16. A method for detecting a clamping state of a palette clamped on a clamping chuck arrangement according to claim 14, wherein the monitoring line is connected via the inlet line to a pneumatic pressure source and wherein at least one pressure sensor for detecting the pressure is arranged in the outlet line connected to the monitoring line at the outlet side, wherein the inlet line is pressurized and that, after a predefined time, the pressure present at the outlet is measured and compared with the pressure measured or set at the inlet, and that, in the event of a pressure difference between the inlet and the outlet of less than 25%, correct clamping of the palette is detected, and/or that, in the event of a pressure difference between the inlet and the outlet of more than 25%, defective clamping of the palette is detected.

17. The method according to claim 16, wherein the outlet line connected at the outlet side to the monitoring line is connected to a second and a third pressure sensor, wherein the inlet line is pressurized and, after a predefined time, the pressure in the inlet line is measured and compared with the pressures measured by means of the two pressure sensors arranged at the outlet side, and that, in the event of a measured pressure difference of more than 10% between the two pressure sensors arranged at the outlet side, an error message is outputted and/or defective clamping of the palette is detected.

* * * * *